United States Patent
Dusanapudi et al.

(10) Patent No.: US 11,061,821 B2
(45) Date of Patent: *Jul. 13, 2021

(54) METHOD, SYSTEM, AND APPARATUS FOR STRESS TESTING MEMORY TRANSLATION TABLES

(71) Applicant: International Business Machines Corporation, Armonk, NY (US)

(72) Inventors: Manoj Dusanapudi, Bangalore (IN); Shakti Kapoor, Austin, TX (US); Nelson Wu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/693,676

(22) Filed: Nov. 25, 2019

(65) Prior Publication Data

US 2020/0089621 A1    Mar. 19, 2020

Related U.S. Application Data

(63) Continuation of application No. 15/843,595, filed on Dec. 15, 2017, now Pat. No. 10,521,355.

(51) Int. Cl.
*G06F 12/10* (2016.01)
*G06F 12/1009* (2016.01)
*G06F 12/1027* (2016.01)

(52) U.S. Cl.
CPC ...... *G06F 12/1009* (2013.01); *G06F 12/1027* (2013.01); *G06F 2212/654* (2013.01); *G06F 2212/684* (2013.01)

(58) Field of Classification Search
CPC .. G06F 12/1009; G06F 12/1027; G06F 12/12; G06F 12/145; G06F 12/1072; G06F 2212/654; G06F 2212/684; G06F 2212/1056; G06F 2212/1008; G06F 11/273
See application file for complete search history.

(56) References Cited

U.S. PATENT DOCUMENTS 8,095,771 B2   1/2012   Sheu et al.
9,355,041 B2   5/2016   Mashey et al.
(Continued)

OTHER PUBLICATIONS

Romanescu, "Cost-Effective Designs for Supporting Correct Execution and Scalable Performance in Many-Core Processors," Dissertation, Duke University, 2010, 150 pages.
(Continued)

*Primary Examiner* — Hiep T Nguyen
(74) *Attorney, Agent, or Firm* — Scully, Scott, Murphy & Presser, P C.

(57) ABSTRACT

Disclosed is a system, method and/or computer product that includes generating translation requests that are identical but have different expected results, transmitting the translation requests from a MMU tester to a non-core MMU disposed on a processor chip, where the non-core MMU is external to a processing core of the processor chip, and where the MMU tester is disposed on a computing component external to the processor chip. The method also includes receiving memory translation results from the non-core MMU at the MMU tester, comparing the results to determine if there is a flaw in the non-core MMU.

20 Claims, 4 Drawing Sheets

(56) References Cited

U.S. PATENT DOCUMENTS

| | | |
|---|---|---|
| 9,594,680 B1 | 3/2017 | Bussa et al. |
| 10,521,355 B2 * | 12/2019 | Dusanapudi ........ G06F 12/1009 |
| 2011/0161620 A1 | 6/2011 | Kaminski et al. |
| 2017/0192869 A1 | 7/2017 | Dusanapudi et al. |
| 2018/0260506 A1 | 9/2018 | Wood et al. |

OTHER PUBLICATIONS

List of IBM Patents or Patent Applications Treated as Related, dated Nov. 25, 2019, 2 pages.

* cited by examiner

METHOD, SYSTEM, AND APPARATUS FOR STRESS TESTING MEMORY TRANSLATION TABLES

BACKGROUND

Typically, processing cores include at least one Memory Management Unit (referred to herein as MMU or core MMUs) for performing virtual to physical address translations. For example, the processing core may assign blocks of virtual memory to different processes executing on the processor (e.g., operating systems or user applications). Each of the virtual addresses corresponds to a physical memory address in memory. The mappings between the virtual and physical addresses are stored in a page table as page table entries. The page table is typically stored in main memory.

When a process sends a request to a processing core to read data from, or write data to, a particular virtual address, the MMU queries the page table (or a translation lookaside buffer) to identify the corresponding physical address. The processing core then uses the physical address to perform the read or write requested by the process.

SUMMARY

Disclosed is a system, method and/or computer product that includes transmitting translation requests from a MMU tester to a non-core MMU disposed on a processor chip, where the non-core MMU is external to a processing core of the processor chip, and where the MMU tester is disposed on a computing component external to the processor chip. The method also includes receiving memory translation results from the non-core MMU at the MMU tester.

In an aspect of the embodiments, a method includes generating, by a MMU tester, a first command table containing a first set of virtual memory addresses and a first set of physical memory addresses and a second command table containing a second set of virtual memory addresses and a second set of physical memory addresses, wherein the first and second sets of virtual memory addresses are identical and the first and second physical memory addresses are different. A first set of translation requests, based on the first command table, may be transmitted from the MMU tester to a non-core MMU disposed on a processor chip, wherein the non-core MMU is external to a processing core of the processor chip, and wherein the MMU tester is disposed on a computing component external to the processor chip. A first flag may be set by the MMU tester that is being polled by the processing core that indicates that the transmission of the first set of translation requests is complete.

In another aspect of the embodiments, the method includes receiving a first set of memory translation results from the non-core MMU at the MMU tester in response to the first set of translation requests and polling a second flag that is set by the processing core when the first set of translation requests are complete and a translation table used by the non-core MMU has been invalidated.

In another aspect of the embodiments the method includes transmitting a second set of translation requests, based on the second command table, from the MMU tester to the non-core MMU and receiving a second set of memory translation results from the non-core MMU at the MMU tester. The first and second sets of memory translation results may be compared, and on a condition that the first and second sets of memory translation are the same, an interrupt is transmitted from the MMU tester to the processing core upon detecting the flaw in the design of the non-core MMU.

In optional aspects of the embodiments, no processing core in the processor chip can transmit translation requests to the non-core MMU. In other optional aspects, the computing component may be a field-programmable gate array (FPGA) and the MMU tester may be executed using circuit elements in the FPGA. In another aspect to the embodiments, transmitting translation requests from a MMU tester to a non-core MMU may include transmitting data between the FPGA and the processor chip using a PCIe link. Further, non-core hardware is disposed in the processor chip and is communicatively coupled to the non-core MMU in the processor chip for performing memory translations. Further, the processor core and the MMU tester may not be in direct communication.

In another aspect of the embodiments, a computing system may include a non-core memory management unit (MMU) disposed in a processor chip that is external to a processing core of the processor chip and a communication link coupling the processor chip to a computing component external to the processor chip. The system may also include a MMU tester disposed on the computing component that is configured to transmit translation requests to the non-core MMU, receive memory translation results from the non-core MMU, set a first flag polled by the processor core to indicate that the translation requests have been sent, and poll a second flag set by the processor core to indicate that the translation requests have been processed and that a translation table used to produce the translation results has been invalidated.

In another aspect of the embodiments, the MMU tester is further configured to generate a first command table comprising a first set of virtual memory addresses and a first set of physical addresses and a second command table comprising a second set of virtual memory addresses and a second set of physical memory addresses, wherein the first and second sets of virtual memory addresses are identical and the first and second sets of physical memory addresses are different. The MMU tester may also be configured to transmit a first set of translation requests based on the first command table and, in response, receive a first set of memory translation results, wherein the MMU tester is further configured to transmit a second set of translation requests based on the second command table after the second flag indicates that the translation table has been invalidated.

In other aspects of the embodiments, the MMU tester may be configured to compare the first and second sets of memory translation results received from the non-core MMU to identify a flaw in a design of the non-core MMU. Additionally, the MMU tester may be configured to transmit an interrupt to the processing core upon detecting a flaw in the design of the non-core MMU.

In other aspects of the embodiments, the computing component may be a field-programmable gate array (FPGA), wherein the MMU tester is executed by circuit elements in the FPGA and the communication link may implement a PCIe protocol to transmit data between the FPGA and the processor chip. In other aspects, the system may include other non-core hardware, disposed in the processor chip, that is communicatively coupled to the non-core MMU and configured to, during execution of the processor chip, transmit memory translation requests to the non-core MMU.

In another aspect of the embodiments, a system may include a computer processor and a memory containing a program that, when executed on the computer processor, performs an operation in a simulated computing environment. The operation may include simulating a non-core MMU in a simulated processor chip, wherein the non-core MMU is external to a processing core of the simulated processor chip and simulating a MMU tester in a simulated computing component external to the processor chip. The simulated MMU tester may be configured to generate a first command table containing a first set of virtual memory addresses and a first set of physical memory addresses and a second command table containing a second set of virtual memory addresses and a second set of physical memory addresses. The first and second sets of virtual memory addresses may be identical. The first and second physical memory addresses may be different, may have differing attributes, or both. The operation also may include simulating a communication link between the simulated processor chip and the simulated computing component. Various steps of the method described above may be implemented on the simulated system.

In some aspects of the embodiments, no processing core in the simulated processor chip can transmit translation requests to the non-core MMU in the simulated computing environment. In other aspects, the computing component is a simulated FPGA, and the operation further includes executing the MMU tester using circuit elements in the simulated FPGA. In another aspect of the embodiments, additional non-core hardware may be disposed in the simulated processor chip and communicatively coupled to the non-core MMU in the simulated processor chip for performing memory translations.

BRIEF DESCRIPTION OF THE DRAWINGS

The various aspects, features and embodiments of the memory system, architectural structure and its method of operation will be better understood when read in conjunction with the figures provided. Embodiments are provided in the figures for the purpose of illustrating aspects, features and/or various embodiments of the memory system, architectural structure and method of operation, but the claims should not be limited to the precise arrangement, structures, features, aspects, embodiments or devices shown, and the arrangements, structures, subassemblies, features, aspects, embodiments, methods, and devices shown may be used singularly or in combination with other arrangements, structures, subassemblies, features, aspects, embodiments, methods and devices.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The following description is made for illustrating the general principles of the invention and is not meant to limit the inventive concepts claimed herein. In the following detailed description, numerous details are set forth in order to provide an understanding of the memory system, architectural structure and method of operation, however, it will be understood by those skilled in the art that different and numerous embodiments of the memory system, architectural structure and method of operation may be practiced without those specific details, and the claims and invention should not be limited to the embodiments, subassemblies, features, processes, methods, aspects, features of details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

Embodiments herein provide a testing hardware module (whether physical or simulated) for testing a non-core MMU in a processor chip. Unlike core MMUs, non-core MMUs are located in a part of the processor chip (e.g., a semiconductor chip) outside of the processing core (or cores) in the chip. Instead of being used to perform address translation requests sent by the processing core, the non-core MMUs may be used by other hardware modules in the processor chip such as compression engines, crypto engines, accelerators, and the like. As such, the non-core MMUs may be inaccessible to the processing core. While the processing core can test the functionality of the core MMU, because the processing core may not be communicatively coupled to the non-core MMUs in the chip, the testing hardware module (referred to as a MMU tester) is used to test the functionality of the non-core MMUs.

In one embodiment, the MMU tester is separate from the processor chip. For example, the MMU tester may be disposed on a field-programmable gate array (FPGA) that is communicatively coupled to the processor chip via a communication link. Using the link, the MMU tester transmits translation requests to the non-core MMU to test its functionality. Using the data provided in the translation requests, the non-core MMU accesses a page table, also referred to as a translation table, in memory to perform virtual to physical address translations. The non-core MMU transmits the results of these translations to the MMU tester which compares these results to expected results to identify any errors. If an error is found, the MMU tester reports this error to a system designer for further evaluation.

Figure 1:
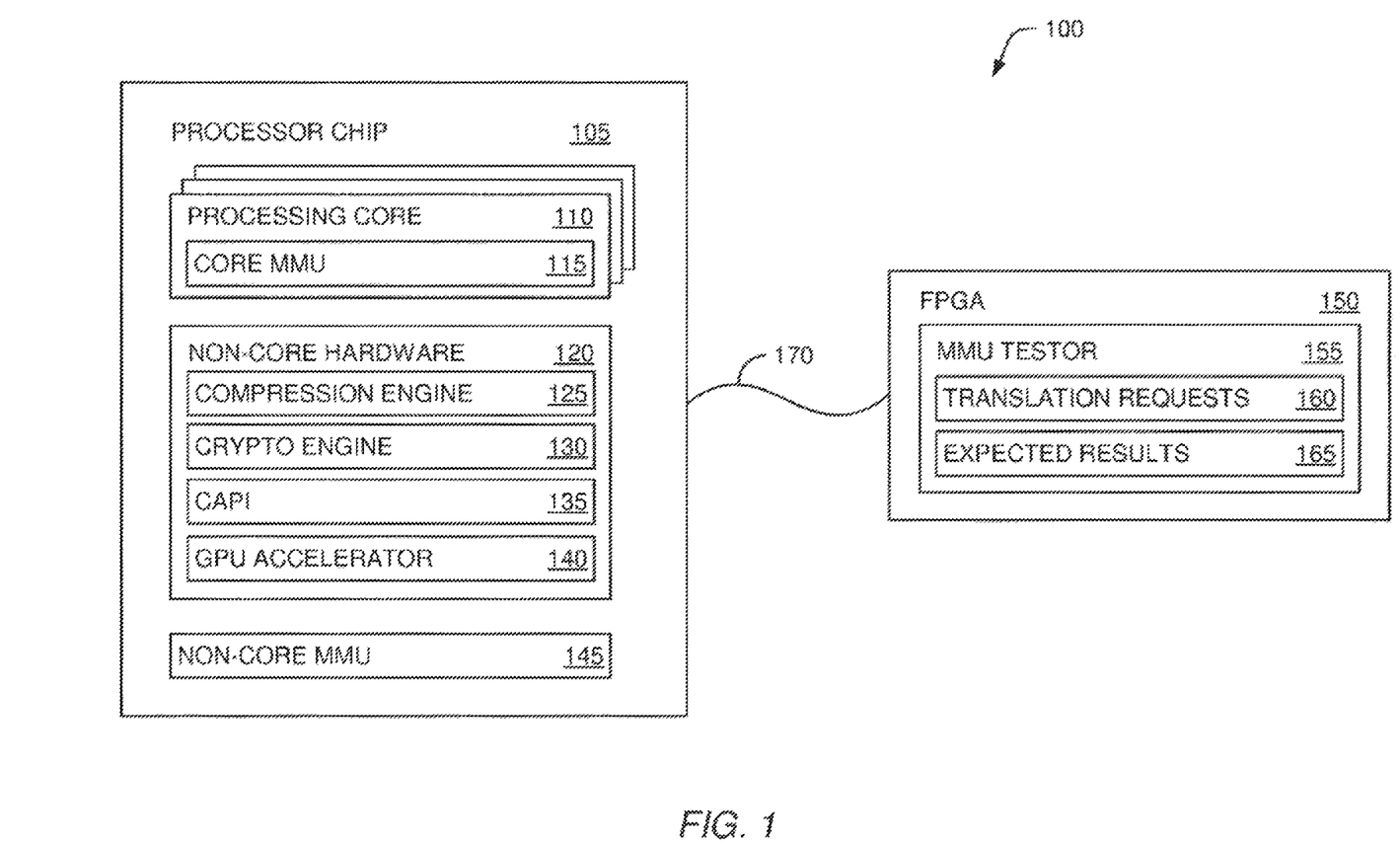
FIG. 1 is a block diagram of a computing system for testing a non-core MMU, according to one embodiment described herein.

FIG. 1 is a block diagram of a computing system 100 for testing a non-core MMU 145, according to one embodiment described herein. The system 100 includes a processor, circuit or chip 105 and a FPGA 150 for testing the non-core MMU 145 on the chip 105. Specifically, the chip 105 includes one or more processing cores 110, non-core hardware 120, and the non-core MMU 145. The processing cores 110 may each include a dedicated core MMU 115 for performing address translations for the processes executing on the respective cores 110. For example, the processing core 110 may execute two different processes which are assigned different blocks of virtual memory. When performing reads or writes to these addresses, the processing core 110 sends a request to the core MMU 115 to translate the virtual memory addresses into physical memory addresses (and vice versa). In one embodiment, the core MMU 115 is located in the portion of the processor chip 105 that includes the processing core 110, but this is not a requirement. For example, the core MMU 115 may still be dedicated for use by the processing core 110 even if the core MMU 115 is located elsewhere in the processor chip 105.

The non-core hardware 120 includes a compression engine 125, crypto engine 130, coherent accelerator processor interface (CAPI) 135, and/or graphics processing unit (GPU) accelerator 140 which are located in the chip 105 external to the processing core 110. Put differently, the non-core hardware 120 are formed on the same semiconductor substrate as the processing core 110 but are outside the boundaries of the hardware elements of the core 110. In one embodiment, one or more of the hardware modules using the non-core MMU 145 may not be located on the processor chip 105. For example, CAPI 135 permits requesting components external to the processor chip 105 to use the non-core MMU 145 to perform address translations. For example, the requesting components could be integrated circuit (IC) chips or FPGAs that are coupled to the processor chip 105 using a PCIe link or a NVLink™ (NVLink is a trademark of NVIDIA Corporation in the US and other jurisdictions).

Instead of using the core MMU 115 to perform virtual to physical address translations, the non-core hardware 120 uses the non-core MMU 145 to perform address translations. That is, the non-core hardware 120 is communicatively coupled to the non-core MMU 145. In one embodiment, the non-core MMU 145 is used exclusively by the non-core hardware 120, and as such, is not communicatively coupled to the processing cores 110. As a result, the processing core 110 may be unable to use the non-core MMU 145 to perform address translations. Moreover, the list of non-core hardware illustrated in FIG. 1 is a non-limiting example of hardware components that may use a non-core MMU to perform address translations. In other embodiments, the processor chip 105 may have fewer or greater number of hardware modules that use the non-core MMU 145. Furthermore, although only one non-core MMU 145 is shown, the processor chip 105 may include any number of non-core MMUs 145. In one embodiment, the non-core MMU 145 is located outside of the portion of the processor chip 105 containing the processing cores 110. For example, the non-core MMU 145 may be located in communication links or fabrics that couple the processing cores 110 to each other. However, the processing cores 110 may be unable to communicate with the non-core MMU 145.

The FPGA 150 includes a MMU tester 155 for validating and troubleshooting the non-core MMU 145. Because the processor chip 105 may not have any routes or traces communicatively coupling the non-core MMU 145 to any of the processing cores 110, the MMU tester 155 validates the functionality of the non-core MMU 145. However, in other embodiments, the non-core MMU 145 may be communicatively coupled to the processing core 110 but the computing system 100 may nonetheless use an external computing component (e.g., the FPGA 150 or separate IC chip) to test the non-core MMU 145. One reason for doing so may be that the MMU tester 155 may be able to test the limits and design of the non-core MMU 145 better than the processing core 110. Stated differently, using the MMU tester 155, which is specifically designed to test the non-core MMU 145, may enable the computing system 100 to better test the bandwidth of the non-core MMU 145, or perform the test quicker than if the processing core 110 (or any of the non-core hardware 120) was used to test the non-core MMU 145.

The MMU tester 155 includes translation requests 160 and expected results 165. The translation requests 160 represent multiple virtual to physical address translation requests that can be executed by the non-core MMU 145. In one embodiment, the translation requests 160 represent all the different possible types or combinations of translations requests that may be sent to the non-core MMU by the non-core hardware 120 during execution. Thus, if the non-core MMU 145 correctly processes the translation requests 160 when being tested, the MMU tester 155 determines the non-core MMU 145 was designed properly.

The computing system 100 includes a communication link 170 (e.g., PCIe link) that couples the FPGA 150 to the processor chip 105. In one embodiment, the communication link 170 is a PCIe link which uses a special protocol—e.g., CAPI 135—to communicate with the non-core MMU 145. As described in more detail below, the MMU tester 155 uses the communication link 170 to transmit the translation requests 160 to the non-core MMU 145 for execution. In response, the non-core MMU 145 performs the corresponding address translations and forwards the resulting addresses to the MMU tester 155 using link communication 170. The MMU tester 155 also includes expected results 165 that are compared to the translation results received from the non-core MMU 145. If the expected results 165 do not match the results received from the non-core MMU 145, the MMU tester 155 determines there is an error and enters a troubleshooting mode.

Figure 2:
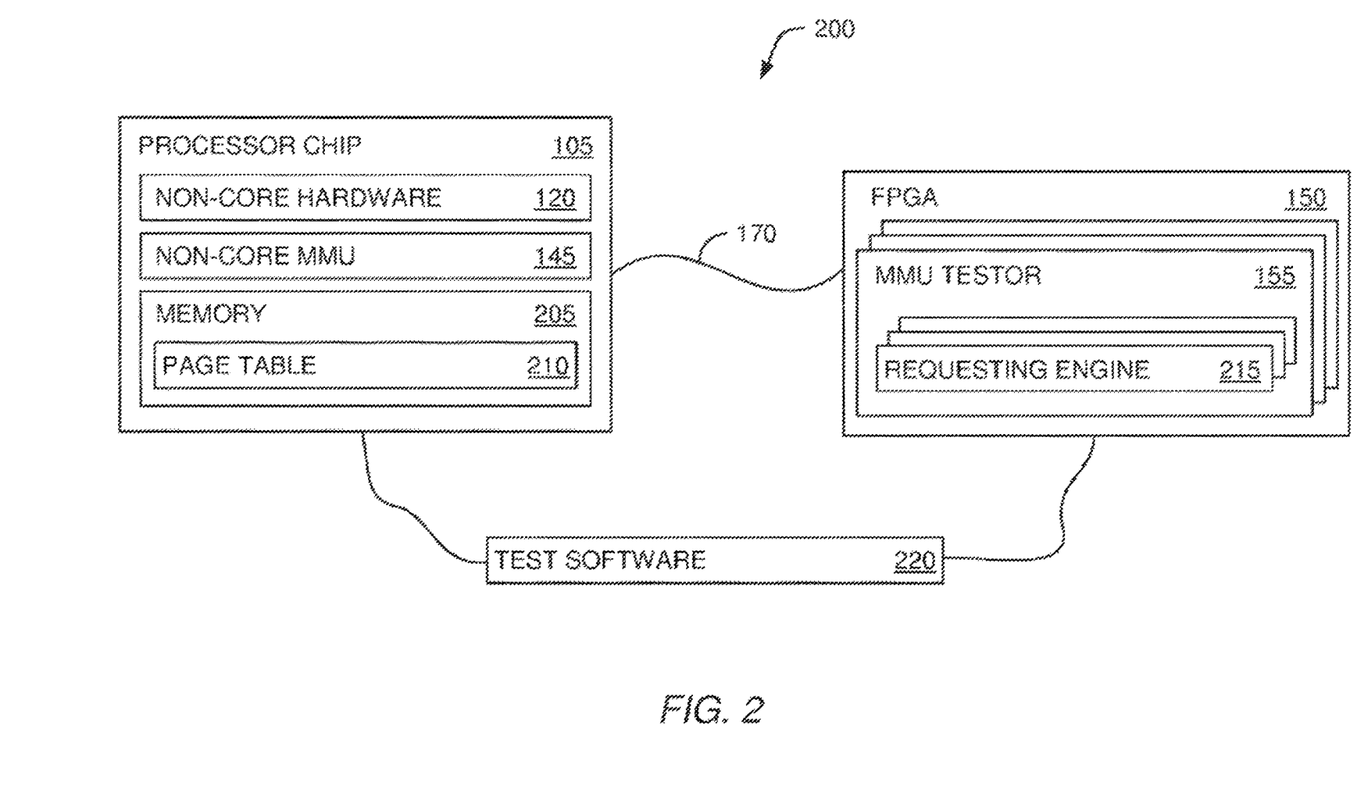
FIG. 2 is a block diagram of a computing system for testing a non-core MMU, according to one embodiment described herein.

FIG. 2 is a block diagram of a computing system 200 for testing the non-core MMU 145, according to one embodiment described herein. The processing core 110 includes the non-core hardware 120, the non-core MMU 145, and a memory 205. For clarity, the processing core 110 has been omitted from the processor chip 105.

The memory 205 includes a page table 210 which stores the mappings of virtual addresses to physical addresses used by the processes executing on the processor chip 105. Although not shown, the processor chip 105 may also include a translation lookaside buffer (TLB) that is used by the MMUs in the chip 105 to perform the address translations. Moreover, the page table 210 may be accessed by both the non-core MMU 145 as well as the core MMUs (not shown). Although FIG. 2 illustrates storing the page table 210 in memory 205 on the processor chip 105, in other embodiments, the page table 210 may be stored on memory external to the processor chip 105 (e.g., main memory).

As shown, the MMU tester 155 includes multiple requesting engines 215 which submit the translation requests to the non-core MMU 145. For example, the engines 215 may submit translation requests in parallel to the non-core MMU 145 which means the non-core MMU 145 may be handling multiple different translation requests concurrently. Although having multiple requesting engines 215 is not necessary, the multiple engines 215 can make it easier to test the bandwidth of the non-core MMU 145 to determine how many requests the non-core MMU 145 can process in a set amount of time.

Computing system 200 includes test software 220 for instructing the MMU tester 155 to test or validate the functionality of the non-core MMU 145. In one embodiment, the test software 220 may generate and store the virtual to physical mappings in the page table 210. Moreover, the test software 220 may provide the translation requests and expected results to the MMU tester 155.

In one embodiment, once the test software 220 begins the test process, the test software 220 is no longer needed to ensure the testing is carried out. That is, although the test software 220 may be used to provide the test data used to perform the test (e.g., the mappings in the page tables 210, translation requests, and expected results), the test itself is carried out solely in hardware independent of the test software 220. Thus, the test software 220 is free to carry out different tests on the processor chip 105 so long as these tests do not alter the ability of the non-core MMU 145 to perform the memory translations. For example, while the MMU tester 155 validates the non-core MMU 145, the test software 220 can test the core MMUs in the processor chip 105. If an error is detected or the test is completed successfully, the MMU tester 155 can send a message to the test software 220 indicating the results of the test. In another embodiment, the MMU tester 155 can use an interrupt signal to provide the results to the processing core in the processor chip 105.

In one example, multiple MMU testers 155 may be used to test the same non-core MMU 145. For example, the FPGA 150 may include a second MMU tester 155 which transmits different translation requests to the non-core MMU 145, or a separate FPGA with its own MMU tester may be coupled to the processor chip 105 to test the non-core MMU 145. In this manner, additional hardware can be added to test the functionality of the non-core MMU 145.

In one embodiment, the computing system 200 may be simulated using a simulation tool rather than using physical components. For example, the simulation tool may be used to test the design of the non-core MMU 145 before the non-core MMU 145 is fabricated onto a chip. In this embodiment, the processor chip 105 and FPGA 150 may be hardware models executing in the simulation tool. The functionality of the non-core MMU 145 and the MMU tester 155 may be defined using a hardware description language (HDL) that is then compiled and executed on the simulation tool. For example, the simulation tool may generate a model for the processor chip 105 and all its components as well as a model of the FPGA 150 and all its components. The simulation tool establishes a simulation environment where the models of the processor chip 105 and FPGA 150 are connected using a simulated PCIe link, thereby directly simulating the physical arrangement shown in FIG. 2. Because the same HDL code used to generate the simulation models will also be used to fabricate the processor chip 105 and configure the FPGA 150, the function of the non-core MMU 145 should be the same in the simulated environment as the physical environment. Testing the non-core MMU 145 using a simulation tool before the processor chip 105 is fabricated may save time and/or cost. For instance, changing the HDL code to fix a flaw or bug detected when simulating the non-core MMU 145 may be cheaper or easier than fixing bugs detected when testing the physical computing system 200.

Even though in one embodiment the hardware modules may be simulated using a simulation tool, the MMU tester and the non-core MMU are still considered separate hardware modules. Because the models may mirror the physical arrangement shown in FIG. 2, the MMU tester and non-core MMU are simulated using separate simulated computing models. That is, the MMU tester operates within a simulated FPGA while the non-core MMU operates in a simulated processor chip.

Figure 3:
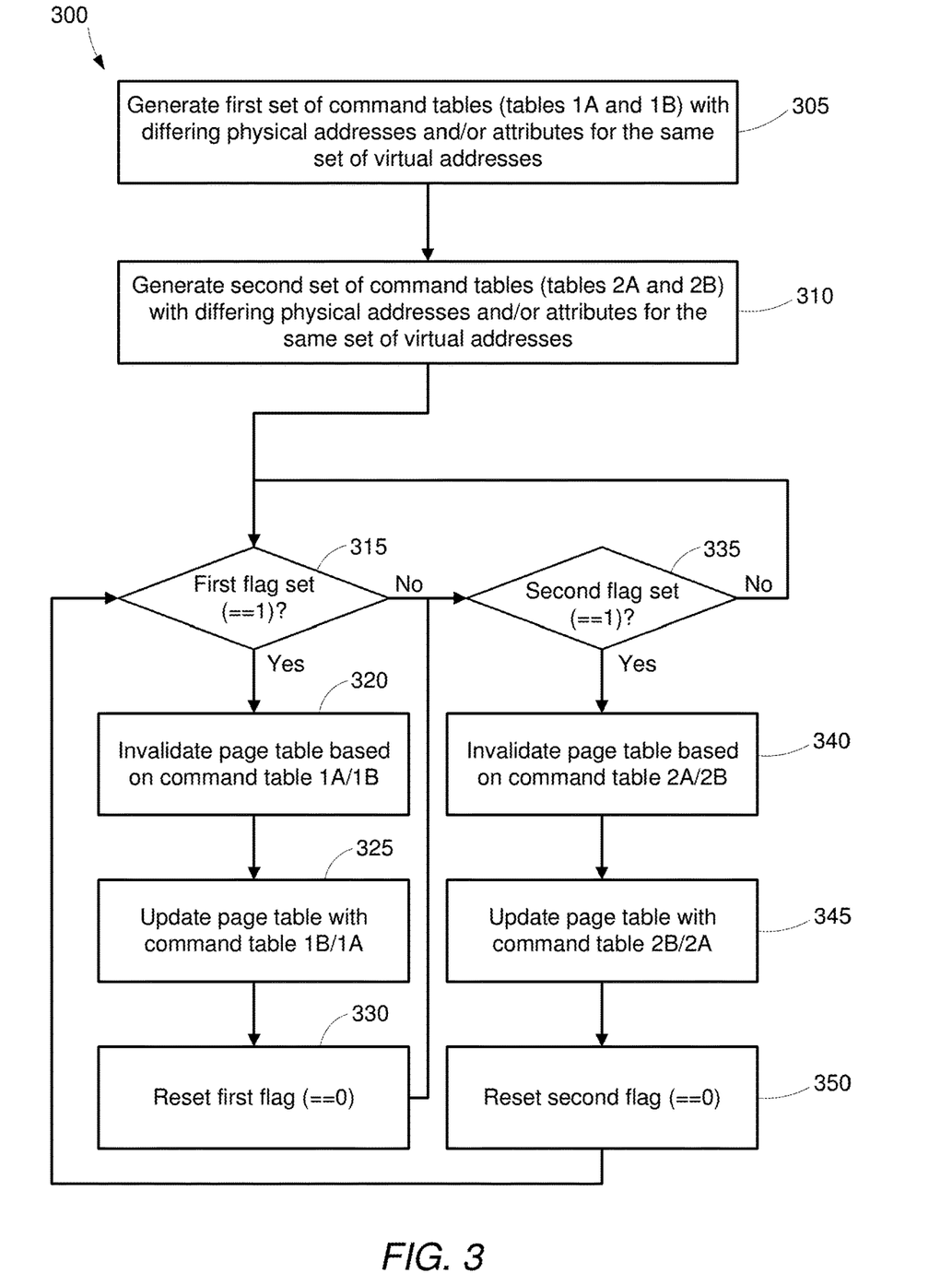
FIG. 3 is flowchart for a method of testing a non-core MMU, according to one embodiment described herein.

FIG. 3 is flowchart of a method 300 for testing a non-core MMU, according to one embodiment described herein. The method 300 includes steps that may be executed by the processor core. At block 305, 310, the core generates two sets of two command tables, for example a first and a second table of a first set of tables (block 305) and a first and a second table of a second set of tables (block 310), that are used to generate translation requests for testing a non-core MMU. The command tables each include a set of virtual memory addresses and a set of physical memory addresses. The virtual memory addresses in the command tables may be used to generate the translation requests, for example, translation requests 160. The physical memory addresses may be used to generate expected results to be returned to the MMU tester, for example, expected results 165. In this example, the virtual memory addresses are the same across both command tables, but the physical memory addresses, e.g. the expected results, are different. In one embodiment, the test software uploads the translation requests and the expected results from the first command table into memory in a FPGA that contains the MMU tester. The MMU tester can identify the translation requests in the first command table that should be transmitted to the non-core MMU during testing. Any reasonable criteria may be used to determine which requests are transmitted to the non-core MMU, for example, all the translation requests in the table may be sent, or a some certain number, and so on.

At block 315, the processor polls a first flag to determine if it is set. The first flag may be, for example, a direct memory access ("DMA") interrupt flag that a processor thread may poll. The first flag, therefore, provides a mechanism for communication between the MMU tester and the processor, for example, to inform the processor that all translation requests for the first table are complete, as will be described in greater detail below in reference to FIG. 4. If the first flag is set, for example by being populated by a value of 1, (block 315: Yes), the processor, in block 320, invalidates a current page table being used by the processor to translate between virtual memory addresses and physical memory addresses. In block 325, the processor then updates the page table with values from the next available page table. For example, assuming the current page table is based on command table 1A. The processor at block 315 may, for example, determine that the first flag is equal to 1 and executes block 320 to invalidate the page table and, in block 325, update the page table with values from command table 1B. Once block 325 has been complete, the processor resets the first flag in block 330, for example, by populating it with a value of 0. Once the first flag is reset, or if the first flag has not yet been set (block 315: No), the processor polls a second flag to determine if it is set, at block 335. If the second flag is set (block 335: Yes), the processor proceeds to, at block 340, invalidate the current page table and update the page table, at block 345 with the next available command table. At step 350, the processor resets the second flag, for example, by populating it with a value of 0. After the second flag has been reset, or if the second flag has not been set (block 335: No), the processor returns to block 315 to poll the first flag.

Figure 4:
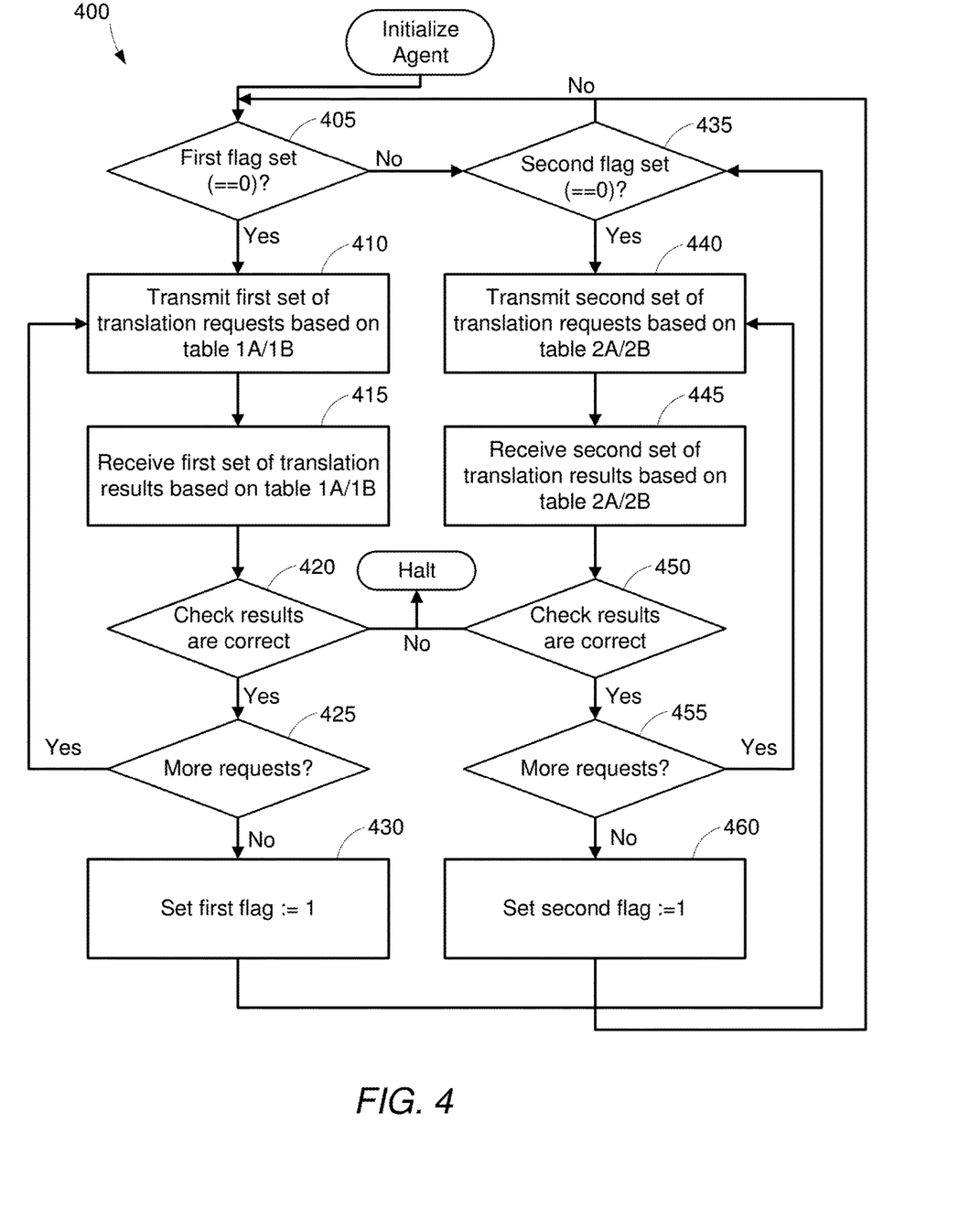
FIG. 4 is flowchart for a method of testing a non-core MMU, according to one embodiment described herein.

FIG. 4 is flowchart of a method 400 for testing a non-core MMU, according to one embodiment described herein. The method 400 includes steps that may be executed by the MMU tester. At block 405, the MMU tester polls the first flag and determines whether it is not set or has been reset, for example, by being populated by a value of 0. As described above, the first flag may have been reset after invalidating a page table or may be set to an initial value, for example, 0. If the flag contains a value equal to 0 (block 405: Yes), the MMU tester generates and transmits, at block 410, a first set of translation requests based on the first set of command tables (table 1A or 1B) from the external computing component (e.g., the FPGA or separate IC chip) to the non-core MMU on the processor chip. As discussed above, the computing system that includes the external computing component, the processor chip, and the link between the two which may be either a physical computing environment or a simulated computing environment. In a physical computing system, the MMU tester uses a physical link between the FPGA and the processor chip to transmit the translation requests to the non-core MMU for execution. In a simulated environment, the MMU tester uses a simulated link for transmitting the requests. In either scenario the functionality of the non-core MMU should be the same.

In one embodiment, the MMU tester may use different modes to transmit the translation requests to the non-core MMU. In one mode, the MMU tester sequentially submits the translation requests to the non-core MMU. For example, the pointer provided by the test software may point to a first translation request in a list of requests. The MMU tester then transmits the translation requests to the non-core MMU using the inherent order of the list. If the MMU tester has multiple requesting engines, the MMU tester may use the engines to send multiple requests in parallel but the requests are nonetheless sequential. In another mode, the MMU tester may transmit the translation requests randomly. The MMU tester may select a random translation request for each of the requesting engines in parallel or send only one random translation request at a time to the non-core MMU. Regardless of the mode utilized by MMU tester, once the first command table is consumed and all appropriate translation requests are transmitted to the non-core MMU, the MMU tester sets a first flag that is polled by the processor.

At block 415, the MMU tester receives the memory translations performed by the non-core MMU. Put differently, the non-core MMU receives the translation requests from the MMU tester and performs the translations using the page table and possibly a TLB. Each translation request may include a virtual memory address (or an effective memory address) which the non-core MMU converts into a physical memory address corresponding to an address in memory.

In one embodiment, the translations requests are designed to test every variant or type of translation request that may be submitted to the non-core MMU during runtime in order to catch any bugs or problems with its functionality. Translation requests may include other information besides a virtual memory address such as read/write flags, transaction type indicators, page access attributes, security or permission bits, process ID information, and the like. The translation requests may include any combination of this information to test whether the non-core MMU behaves in the expected manner. For example, some physical memory addresses may be assigned to certain processes. Thus, one translation request may include a process ID corresponding to a process that is not assigned to the physical memory addresses. If the non-core MMU nonetheless returns the physical address, then the test MMU can determine there is a bug in the non-core MMU.

In other examples, the translation requests may change the protection bits in the requests, or the page access attributes to test cache full and non-cache full situations. Moreover, the translation requests may change the security or permission bits, or provide invalid virtual memory addresses to test the functionality of the non-core MMU. In one embodiment, the translation requests may test the invalidation of page tables. As such, the translation requests may test two sets of translation requests that are identical but have different expected results to ensure the memory translation results are different. In other words, if the results are the same after the prior page file is invalidated, it is an indication that the page table is not being properly migrated after invalidation is returned.

At block 420, the MMU tester determines whether the first set of translation results are correct. The MMU tester compares the first set of memory translations received from the non-core MMU to the second set of translation results received from the non-core MMU. If the results do not match, the MMU tester knows that the page table was invalidated and repopulated properly. If the results do match, there is a bug in the computing system. The MMU tester may also check one or both of the translation results to the expected results. The expected results may include the physical memory address that corresponds to the virtual memory address provided in a translation request. However, as mentioned above, the MMU tester may test situations where the non-core MMU should not complete the memory translation. For example, the translation request may include a process ID or security information that indicates the process is not assigned to the corresponding physical memory location. In these cases, if designed properly, the non-core MMU should reply with an error message or a notice indicating that the memory translation cannot be performed. In another example, the MMU tester may transmit a translation request that includes a virtual memory address not in the page table. If the non-core MMU provides a physical memory address rather than indicating the virtual address was not found in the page table (e.g., a page table violation), the MMU tester can determine that the design of the non-core MMU is flawed.

At block 425, the MMU tester determines whether there are any more translation requests. In some embodiments, transmission may be complete after a certain number of iterations, after a certain amount of time, or any other method of determining whether transmission of the first set of translation requests is complete. The embodiments are not limited in this regard. If there are more translation requests (block 425: Yes), the process loops back and repeats steps 410 through 425 until all requests have been transmitted. For example, the MMU tester may generate translation requests based on table 1B. Once transmission is complete and all requests have been transmitted (block 425: No), the process continues to the next block.

At block 430, the MMU tester sets a flag to indicate that the transmission of the translation requests is complete. For example, a processor thread may be flagged with an interrupt direct memory access ("DMA") into a flag memory location being polled by the processor thread. The processor thread may periodically poll the flag memory location to find out if an event has occurred. In an example embodiment, the MMU tester may use an interrupt flag to inform the processor core when the first set of transmission requests have been completed. This allows the processor core to know when it can invalidate the stale page table and generate a new page table for the second set of translation requests, for example. In the example of FIG. 4, the first flag is set to a value of 1 at step 430.

Once the first set of translation requests based on table 1 are complete, MMU tester then polls a second flag memory location, set to a value of 1 by the core processor, which indicates that the prior page table, for example, for table 1, has been invalidated, a new page table has been entered, and the non-core MMU is ready to receive a second set of memory translation requests. At step 435, MMU tester repeatedly polls this second flag to determine whether the translation results are complete. If the flag does not indicate this (block 435: No), the process returns to step 405 to poll the first flag. As long as neither the first flag (step 405: No) and the second flag (step 435: No) are not set, the process continues to poll the first and second flags until one of the flags has been set to indicate that the non-core MMU is ready for additional translation requests. If the first flag is set (step 405: Yes) then steps 410 through 430 as described above are repeated. If, for example, the second flag is set (block 435: Yes), the process continues to block 440.

At block 440, the second set of translation requests are transmitted to the non-core MMU. The second set of translation requests are based on the second command table. In some embodiments, the second set of translation requests are identical to the first set of translation requests. However, because the first page table has been invalidated and a second page table is being used, the translation results should be different. In other embodiments, there are multiple tables that can be used to create the second set of translation requests, for example tables 2A and 2B. At block 445, a second set of translation results is received from the non-core MMU.

At block 450, the MMU tester compares the first set of memory translations received from the non-core MMU to the second set of translation results received from the non-core MMU. If the results do not match (step 450: Yes), the MMU tester knows that the page table was invalidated and repopulated properly. If the results do match (step 450: No), there is a bug in the computing system and the process is halted for debug, for example. The MMU tester may also check one or both of the translation results to the expected results. The expected results may include the physical memory address that corresponds to the virtual memory address provided in a translation request. However, as mentioned above, the MMU tester may test situations where the non-core MMU should not complete the memory translation. For example, the translation request may include a process ID or security information that indicates the process is not assigned to the corresponding physical memory location. In these cases, if designed properly, the non-core MMU should reply with an error message or a notice indicating that the memory translation cannot be performed. In another example, the MMU tester may transmit a translation request that includes a virtual memory address not in the page table. If the non-core MMU provides a physical memory address rather than indicating the virtual address was not found in the page table (e.g., a page table violation), the MMU tester can determine that the design of the non-core MMU is flawed.

If a bug is detected at block 450, method 300 may, in addition or in the alternative, transmit a message or interrupt to the processing core or the test software indicating that there may be a problem with the design of the non-core MMU. Alternatively, if method 400 is being performed in a simulated computing environment, the MMU tester may transmit a message to the simulation tool indicating the non-core MMU may contain a bug. In one embodiment, regardless whether method 400 is performed in a physical or simulated computing environment, the MMU tester may also collect troubleshooting data to help the system designer find and fix the bug. For example, the MMU tester may output the translation request being performed when the bug was identified as well as the previous five or ten translation requests executed by the non-core MMU.

In one embodiment, even if a bug is detected at block 450, method 400 may continue to perform all the other translation requests in the second set of translation requests before sending an interrupt to the processing core or test software. In this example, the MMU tester may collect and save the troubleshooting data until all the translation requests have been processed. Once complete, the MMU tester may only then transmit the troubleshooting data to the processing core or the test software for evaluation.

At block 455, the MMU tester determines whether there are any more translation requests. In some embodiments, transmission may be complete after a certain number of iterations, after a certain amount of time, or any other method of determining whether transmission of the first set of translation requests is complete. The embodiments are not limited in this regard. If there are more translation requests (block 455: Yes), the process loops back and repeats steps 440 through 455 until all requests have been transmitted. For example, the MMU tester may generate translation requests based on table 2B. Once transmission is complete and all requests have been transmitted (block 455: No), the process continues to the next block.

At block 460, the MMU tester sets a flag to indicate that the transmission of the translation requests based on the second set of translation requests (or the second set of command tables) is complete. For example, a processor thread may be flagged with an interrupt direct memory access ("DMA") into a flag memory location being polled by the processor thread. The processor thread may periodically poll the flag memory location to find out if an event has occurred. In an example embodiment, the MMU tester may use an interrupt flag to inform the processor core when the first set of transmission requests have been completed. This allows the processor core to know when it can invalidate the stale page table and generate a new page table for the second set of translation requests, for example. In the example of FIG. 4, the first flag is set to a value of 1 at step 460.

Once the first set of translation requests based on table 2 are complete, MMU tester then polls a second flag memory location, set to a value of 1 by the core processor, which indicates that the prior page table, for example, for table 2, has been invalidated, a new page table has been entered, and the non-core MMU is ready to receive a second set of memory translation requests. At step 405, MMU tester repeatedly polls this second flag to determine whether the translation results are complete. If the flag does not indicate this (block 405: No), the process returns to step 435 to poll the first flag. As long as neither the first flag (step 405: No) and the second flag (step 435: No) are not set, the process continues to poll the first and second flags until one of the flags has been set to indicate that the non-core MMU is ready for additional translation requests. If the first flag is set (step 405: Yes) then steps 410 through 430 as described above are repeated. If, for example, the second flag is set (block 435: Yes), then steps 440 through 460 are repeated.

In one embodiment, method 400 may continue operating indefinitely so long as no bugs are identified. For example, to test the longevity of the non-core MMU, the MMU tester will continue to submit translation requests to determine how long the physical circuit components in the non-core MMU last. To do so, the MMU tester may continue repeating the same list of translation requests. Alternatively, method 400 may stop when the MMU tester has successfully tested all the translation requests provided by the test software.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to various embodiments, other and further embodiments of the invention may be devised without departing from the basic scope thereof, and the scope thereof is determined by the claims that follow.

What is claimed is:

1. A method for testing a non-core memory management unit ("MMU") in a processor, the method comprising:
generating by the processor a first set of command tables containing a first set of virtual memory addresses and a first set of physical memory addresses;
receiving at the non-core MMU a first plurality of translation requests that were generated based upon the first set of virtual memory addresses from the first set of command tables;
translating by the non-core MMU translation requests that were generated based on the virtual memory addresses contained in the first command table, generating a page table using translations of the virtual addresses contained in the first command table;
polling a first flag to determine if the non-core MMU has completed translating the plurality of translation requests; and
invalidating the page table on a condition that the first flag indicates that the plurality of translation requests from the first command table have been translated and completed by the non-core MMU.

2. The method of claim 1, wherein no processing core in the processor can transmit translation requests to the non-core MMU.

3. The method of claim 1, wherein non-core hardware is disposed in the processor and the non-core hardware is communicatively coupled to the non-core MMU in the processor chip for performing memory translations.

4. The method of claim 1, further comprising setting the first flag to indicate that the first plurality of translation requests have been translated.

5. The method of claim 1, wherein the first flag is set by a MMU tester after a first set of translation results are received by the MMU tester.

6. The method of claim 5, wherein the processor and the MMU tester are not in direct communication.

7. The method of claim 1 further comprising generating by the processor a second set of command tables containing a second set of virtual memory addresses and a second set of physical memory addresses.

8. The method of claim 7 further comprising:
receiving at the non-core MMU a plurality of translation requests generated based upon the second set of virtual memory addresses from the second command table;
translating by the non-core MMU the plurality of translation requests that were generated based upon the virtual memory addresses contained in the second command table; and
updating the page table using the translations of the virtual memory addresses from the second command table.

9. The method of claim 8, wherein the first and second sets of virtual memory addresses in the first and second command tables are identical.

10. The method of claim 9, further comprising in response to updating the page table with translations from the virtual memory addresses in the second command table, setting the first flag to indicate that the non-processor core has not completed the translation requests.

11. The method of claim 8, further comprising:
polling a second flag to determine if the non-core MMU has completed the second set of translation requests;
invalidating the updated page table on a condition that the second flag indicates that the second set of translation results have been received; and
resetting the second flag.

12. A method for testing a non-core memory management unit ("MMU") disposed on a processor chip, wherein the non-core MMU is external to a processing core on the processor chip, the method comprising:
polling by a non-core MMU tester a first flag to determine whether the non-core MMU is ready to receive a first set of translation requests that include a first set of virtual memory addresses;
on a condition that the first flag indicates that the non-core MMU is ready to receive the first set of translation requests, transmitting the first set of translation requests from the MMU tester to the non-core MMU, wherein the first set of translation requests are based on a first command table; and
receiving, at the MMU tester, a first set of memory translation results from the non-core MMU in response to the first set of translation requests; and
comparing the first set of translation results to a previously received set of translation results and halting execution of the MMU tester on a condition that the first set of translation results match the previously received set of translation results.

13. The method of claim 12, wherein the MMU tester is disposed on a computing component external to the processor chip.

14. The method of claim 12, further comprising setting the first flag to indicate that the first set translation results have been received.

15. The method of claim 12, further comprising:
transmitting a second set of translation requests from the MMU tester to the non-core MMU, wherein the second set of translation requests are based on a second command table;
receiving a second set of translation results from the non-core MMU at the MMU tester; and
comparing the second set of memory translation results with a previously received set of translation results, and halting execution of the MMU tester on a condition that the first set of translation results match the previously received set of translation results.

16. The method of claim 15, further comprising setting the first flag to indicate that the second set translation results have been received.

17. The method of claim 13, wherein the computing component is a field-programmable gate array (FPGA), the method further comprising:
   executing the MMU tester using circuit elements in the FPGA.

18. The method of claim 17, wherein transmitting translation requests from a MMU tester to a non-core MMU comprises:
   transmitting data between the FPGA and the processor chip using a PCIe link.

19. A system, comprising:
   a computer processor;
   a MMU tester separate from the simulated processor chip, wherein the MMU tester is configured to generate a first set of translation requests based on a first command table containing a first set of virtual memory addresses and a first set of physical memory addresses;
   a communication link between a simulated processor chip and the MMU tester; and
   a memory containing a computer program that, when executed by the computer processor, performs an operation in a simulated computing environment, the operation comprising:
      simulating a non-core MMU in the simulated processor chip, wherein the non-core MMU is external to a processing core of the simulated processor chip;
      simulating a process for testing the non-core MMU comprising:
         generating the first command table containing the first set of virtual memory addresses and the first set of physical memory addresses;
         generating a page table based on the first command table, wherein the page table enables the non-core MMU to execute the first set of translation requests that were generated based on the virtual and physical memory addresses contained in the first command table by translating the first set of virtual memory address into the first set of physical memory addresses;
         polling a first flag to determine if the non-core MMU has completed the first set of translation requests; and
         invalidating the page table on a condition that the first flag indicates that the first set of translation requests have been completed by the non-core MMU.

20. The system of claim 19, wherein the operation further comprises:
   polling a second flag to determine whether the non-core MMU is ready to receive the first set of translation requests that include the first set of virtual memory addresses;
   on a condition that the second flag indicates that the non-core MMU is ready to receive the first set of translation requests, transmitting the first set of translation requests from the MMU tester to the non-core MMU, wherein the first set of translation requests are based on the first command table; and
   receiving, at the MMU tester, the first set of memory translation results from the non-core MMU in response to the first set of translation requests; and
   comparing the first set of translation results to a previously received set of translation results and halting execution of the MMU tester on a condition that the first set of translation results match the previously received set of translation results.

* * * * *